(12) United States Patent
Quan et al.

(10) Patent No.: US 10,179,314 B2
(45) Date of Patent: Jan. 15, 2019

(54) METHOD FOR THE HIGH-THROUGHPUT PREPARATION OF CARBON NANOTUBE HOLLOW FIBER MEMBRANES

(71) Applicant: DALIAN UNIVERSITY OF TECHNOLOGY, Liaoning (CN)

(72) Inventors: Xie Quan, Liaoning (CN); Gaoliang Wei, Liaoning (CN); Shuo Chen, Liaoning (CN); Hongtao Yu, Liaoning (CN)

(73) Assignee: DALIAN UNIVERSITY OF TECHNOLOGY, Iaoning (CN)

( * ) Notice: Subject to any disclaimer, the term of this patent is extended or adjusted under 35 U.S.C. 154(b) by 262 days.

(21) Appl. No.: 15/120,637

(22) PCT Filed: Apr. 28, 2014

(86) PCT No.: PCT/CN2014/076349
§ 371 (c)(1),
(2) Date: Aug. 22, 2016

(87) PCT Pub. No.: WO2015/131436
PCT Pub. Date: Sep. 11, 2015

(65) Prior Publication Data
US 2017/0014777 A1    Jan. 19, 2017

(30) Foreign Application Priority Data
Mar. 5, 2014 (CN) .......................... 2014 1 0079152

(51) Int. Cl.
*B01D 67/00* (2006.01)
*B01D 69/02* (2006.01)
(Continued)

(52) U.S. Cl.
CPC ...... *B01D 67/0079* (2013.01); *B01D 67/0011* (2013.01); *B01D 67/0067* (2013.01);
(Continued)

(58) Field of Classification Search
None
See application file for complete search history.

(56) References Cited

U.S. PATENT DOCUMENTS

| 2008/0290020 A1 | 11/2008 | Marand et al. | |
| 2010/0297449 A1* | 11/2010 | Kitano | B82Y 30/00 |
| | | | 428/408 |

(Continued)

FOREIGN PATENT DOCUMENTS

| CN | 103140278 A | 6/2013 |
| CN | 103316594 A | 9/2013 |

(Continued)

*Primary Examiner* — Mary Lynn F Theisen
(74) *Attorney, Agent, or Firm* — Muncy, Geissler, Olds & Lowe, P.C.

(57) ABSTRACT

The invention, belonging to the field of membrane technology, presents a method for the high-throughput preparation of carbon nanotube hollow fiber membranes. This method contains three major steps. Firstly, the pristine carbon nanotubes (CNTs) are added into a mixture of concentrated nitric acid and sulfuric acid, which is then heated at 40~80° C. for 0.5~6 hours. Secondly, the surface-functionalized CNTs and polyvinyl butyral (PVB) are dispersed and dissolved, respectively, in organic solvents at a mass ratio of 1:0.2~1:4~8 to form homogeneous spinning solution, which is squeezed into water as shell liquid with water as core liquid at a flow rate ratios of 0.5~5:1 through a spinneret to form CNT/PVB hollow fibers. Finally, the dry fibers are calcinated at 600~1000 ° C. for 1~4 hours in absence of oxygen to produce free-standing CNT hollow fiber membranes. The method involved in this invention is simple and highly efficient without needing any templates, expensive apparatuses and chemicals. Additionally, the obtained electrically conductive CNT hollow fiber membranes feature a high porosity, high water flux and strong acid/alkali resistance.

7 Claims, 2 Drawing Sheets

Figure 1:
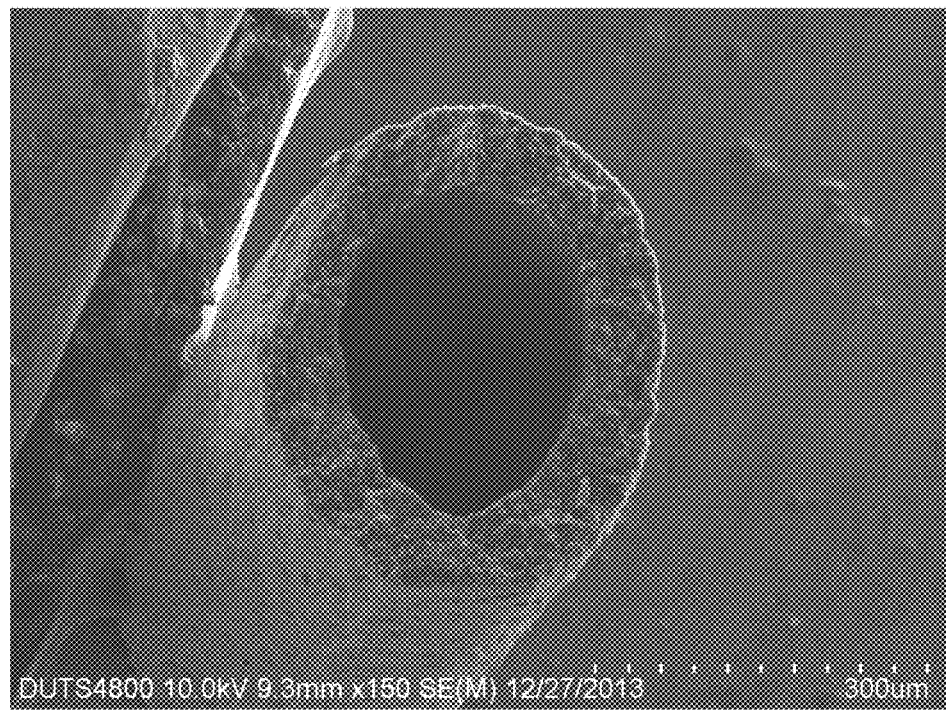

(51) Int. Cl.
*B01D 69/08* (2006.01)
*B01D 69/14* (2006.01)
*B01D 71/38* (2006.01)
*B82B 3/00* (2006.01)
*B01D 71/02* (2006.01)
*B01D 71/32* (2006.01)
*B01D 71/42* (2006.01)
*B01D 71/44* (2006.01)
*B01D 71/66* (2006.01)

(52) U.S. Cl.
CPC .............. *B01D 69/02* (2013.01); *B01D 69/08* (2013.01); *B01D 69/085* (2013.01); *B01D 69/148* (2013.01); *B01D 71/021* (2013.01); *B01D 71/32* (2013.01); *B01D 71/42* (2013.01); *B01D 71/44* (2013.01); *B01D 71/66* (2013.01); *B01D 71/38* (2013.01); *B01D 2325/26* (2013.01); *B82B 3/0009* (2013.01)

(56) References Cited

U.S. PATENT DOCUMENTS

| | | | |
|---|---|---|---|
| 2012/0067548 A1* | 3/2012 | Tun | F28D 7/16 165/104.11 |
| 2013/0098833 A1 | 4/2013 | Sun et al. | |
| 2014/0326669 A1* | 11/2014 | Flieg | B01D 67/0011 210/651 |
| 2016/0301084 A1* | 10/2016 | Gendel | C25D 13/02 |
| 2017/0252704 A1* | 9/2017 | Cooper | B01D 71/022 |

FOREIGN PATENT DOCUMENTS

| | | |
|---|---|---|
| CN | 103316597 A | 9/2013 |
| CN | 103464004 A | 12/2013 |

\* cited by examiner

METHOD FOR THE HIGH-THROUGHPUT PREPARATION OF CARBON NANOTUBE HOLLOW FIBER MEMBRANES

TECHNICAL FIELDS

The invention belongs to the field of membrane technology, relating to a method for the high-throughput preparation of carbon nanotube hollow fiber membranes.

BACKGROUND ART

Membrane technology can function as separation, concentration, purification and refining process. Due to its high efficiency, energy conservation, environmental friendliness, molecular level precision, simple process and easy control, membrane technology has found various applications from food industry, medicine, chemical industry to environmental protection, producing great economic and social benefit, and has thus become one of the most important separation technologies.

As one of three membrane architectures, hollow fiber membranes possess many advantages compared with flat sheet ones and tubular ones, for example, low cost of per unit membrane area, tunable scale and shape of membrane modules, and high density and large area of membranes loaded in a module. Currently, polymeric hollow fiber membranes have dominated the market share due to their low cost and easy preparation. However, commercial polymeric ones usually suffer from some technological limitations such as low resistance to chlorine and high temperature, inherent fouling, low flux and single function. It has been reported that hollow fiber membranes composed of carbon nanotubes (CNTs) can over these disadvantages because of several reasons. Firstly, the CNT hollow fiber membranes have a high flux derived from its high porosity. Secondly, their pores are relatively difficult to be blocked due to its particular structure. Thirdly, the CNT hollow fiber membranes can capture with high adsorption capacity small molecules that cannot be rejected. Finally, they possess the unique electrochemical recovery ability after adsorption saturation.

TECHNICAL PROBLEMS

There is only one report on the preparation of CNT hollow fiber membranes (see China patent ZL201310272800.4). The method in this patent is based on electrophoresis deposition and needs metal wires as templates that will be removed at last, which will greatly increase the cost. Additionally, the preparation process is tedious and inefficient because the CNTs are deposited on templates layer by layer.

SOLUTIONS

In order to address the problems above, we put forward a novel strategy for the high-throughput and low-cost preparation of CNT hollow fiber membranes. This strategy is based on wet-spinning technology and uses polymers to mould CNTs into hollow fiber structure.

The preparation process of CNT hollow fiber membranes involved in this invention typically contains three steps as follows:

(1) Surface modification of CNTs: Pristine CNTs are added into a mixture of concentrated sulfuric acid and nitric acid (≤5:1, v/v), which is heated at 40~80 °C. for 0.5~6 hours. CNTs are then recovered by filtration.

(2) Wet-spinning process: The surface-functionalized CNTs and polyvinyl butyral (PVB) are dispersed and dissolved, respectively, in organic solvents at a mass ratio of 1:0.2~1:4~8 to form homogeneous spinning solution. The spinning solution and water as shell liquid and core liquid, respectively, are squeezed at a flow rate ratio of 0.5~5:1 into water through a spinneret to form CNT/PVB hollow fibers.

(3) Calcination: The obtained fibers are dredged up from the water and dried after being washed for several times, followed by being calcinated at 600~1000° C. for 1~4 hours in absence of oxygen to form free-standing CNT hollow fiber membranes.

The spinning solution involved in Step (2) can also contain polymeric additives, and the mass ratio of them to CNTs is ≤0.2.

The polymeric additives involved in Step (2) are polyacrylonitrile (PAN) or poly (vinylidene fluoride) (PVDF) or sulfonated polyphenyleneoxide (SPPO), or a mixture of several kinds of them.

The organic solvents involved in Step (2) are N,N-dimethyl formamide or N,N-dimethyl acetamide or N-methyl pyrrolidone, or a mixture of several kinds of them.

The CNTs involved in Step (1) are single-walled CNTs or double-walled CNTs or multiwalled CNTs, or a mixture of several kinds of them.

The drying strategy involved in Step (3) is ambient drying or vacuum freeze drying.

ADVANTAGEOUS EFFECTS OF THE INVENTION

The method involved in this invention is simple and highly efficient without needing any templates, expensive apparatuses and chemicals. Additionally, the obtained electrically conductive CNT hollow fiber membranes feature a high porosity, high water flux and strong acid/alkali resistance.

SCHEMATIC DIAGRAM

FIG. 1: The scanning electron microscope (SEM) image of a CNT hollow fiber membrane prepared as described in Example 1.

Figure 2:
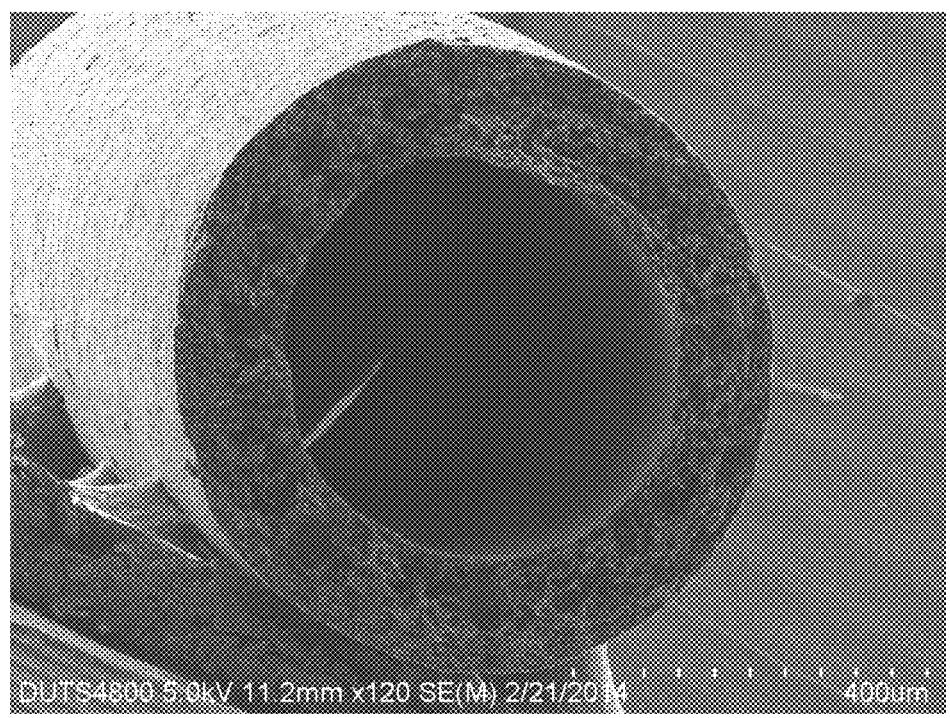

FIG. 2: The SEM image of a CNT hollow fiber membrane prepared as described in Example 2.

Figure 3:
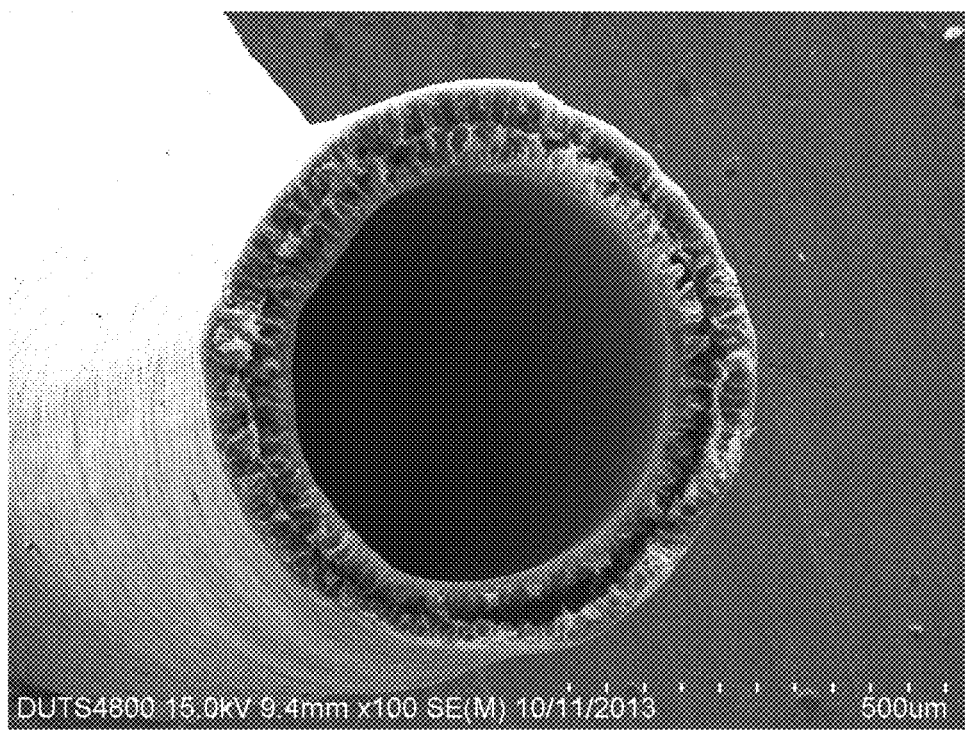

FIG. 3: The SEM image of a CNT hollow fiber membrane prepared as described in Example 3.

Figure 4:
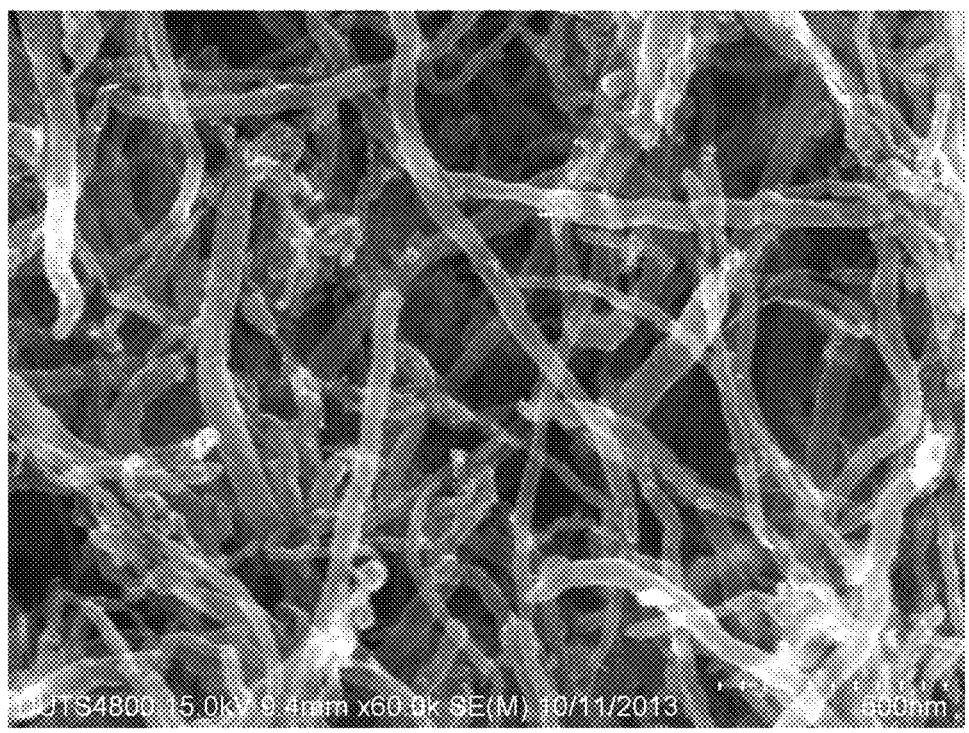

FIG. 4: The high-resolution SEM image of membrane surface of a CNT hollow fiber membrane prepared as described in Example 6.

DETAIL EXAMPLES FOR INVENTION

Some examples are given to further illustrate the detail preparation process of CNT hollow fiber membranes, and it should be emphasized that this invention is not confined to these examples as follows.

Example 1

Surface modification of CNTs: About 10 g pristine multiwalled CNTs with 60~100 nm in outer diameters are added into a mixture of concentrated sulfuric acid and nitric acid (3:1, v/v). The mixture is then heated at 60° C. for 4 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs and 2.5 g PVB are dispersed and dissolved, respectively, in 50 g N, N-dimethyl formamide to form homogeneous spinning solution. The spinning solution as shell liquid and water as core liquid are squeezed at flow rates of 15 mL/h and 7 mL/h, respectively, into water through a spinneret to form CNT/PVB hollow fibers.

Calcination: The obtained CNT/PVB hollow fibers are dredged up from the water after being washed for several times, followed by being dried at room temperature (20° C).The fibers are then calcinated at 600° C. in Ar flow for 1 h to form free-standing CNT hollow fiber membranes.

FIG. 1 indicates that the obtained mutiwalled CNT hollow fiber membranes have no cracks, and possess an outer diameter of 500 μm and an inner diameter of 340 μm.

Example 2

Surface modification of CNTs: About 10 g pristine mutiwalled CNTs with 60~100 nm in outer diameters are added into a mixture of concentrated sulfuric acid and nitric acid (2:1, v/v). The mixture is then heated at 40° C. for 4 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs, 1.5 g PVB and 1.0 g PAN are dispersed and dissolved, respectively, in 80 g N, N-dimethyl formamide to form homogeneous spinning solution. The spinning solution as shell liquid and water as core liquid are squeezed at flow rates of 20 mL/h and 10 mL/h, respectively, into water through a spinneret to form CNT/PVB/PAN hollow fibers.

Calcination: The obtained CNT/PVB/PAN hollow fibers are dredged up from the water after being washed for several times, followed by being dried at room temperature (20° C).The fibers are then calcinated at 1000° C. under vacuum for 1 h to form free-standing CNT hollow fiber membranes.

FIG. 2 indicates that the obtained mutiwalled CNT hollow fiber membranes feature uniform outer/inner diameters (800/560 μm), and a macroporous (in the micrometer size range) structure in their cross section.

Example 3

Surface modification of CNTs: About 10 g pristine mutiwalled CNTs with 60~100 nm in outer diameters are added into a mixture of concentrated sulfuric acid and nitric acid (3:1, v/v). The mixture is then heated at 60° C. for 6 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs and 1.0 g PVB are dispersed and dissolved, respectively, in 50 g N, N-dimethyl formamide to form homogeneous spinning solution. The spinning solution as shell liquid and water as core liquid are squeezed at flow rates of 15 mL/h and 10 mL/h, respectively, into water through a spinneret to form CNT/PVB hollow fibers.

Calcination: The obtained CNT/PVB hollow fibers are dredged up from the water after being washed for several times, followed by being freezing dried. The fibers are then calcinated at 800° C. in Ar flow for 1 h to form free-standing CNT hollow fiber membranes.

FIG. 3 indicates that the obtained mutiwalled CNT hollow fiber membranes feature uniform outer/inner diameters (700/500 μm), and an asymmetrical structure in their cross section.

Example 4

Surface modification of CNTs: About 10 g pristine single-walled CNTs with are added into a mixture of concentrated sulfuric acid and nitric acid (3:1, v/v). The mixture is then heated at 40° C. for 0.5 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs, 2.5 g PVB and 1.0 g SPPO are dispersed and dissolved, respectively, in 80 g N, N-dimethyl formamide to form homogeneous spinning solution. The spinning solution as shell liquid and water as core liquid are squeezed at flow rates of 30 mL/h and 15 mL/h, respectively, into water through a spinneret to form CNT/PVB/SPPO hollow fibers.

Calcination: The obtained CNT/PVB/SPPO hollow fibers are dredged up from the water after being washed for several times, followed by being dried at room temperature (20° C).The fibers are then calcinated at 800° C. in Ar flow for 2 h to form free-standing CNT hollow fiber membranes.

Example 5

Surface modification of CNTs: About 10 g pristine mutiwalled CNTs with 20~40 nm in outer diameters are added into a mixture of concentrated sulfuric acid and nitric acid (3:1, v/v). The mixture is then heated at 60° C. for 1 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs, 2.5 g PVB and 1.0 g SPPO are dispersed and dissolved, respectively, in 70 g N, N-dimethyl formamide to form homogeneous spinning solution. The spinning solution as shell liquid and water as core liquid are squeezed at flow rates of 20 mL/h and 10 mL/h, respectively, into water through a spinneret to form CNT/PVB/SPPO hollow fibers.

Calcination: The obtained CNT/PVB/SPPO hollow fibers are dredged up from the water after being washed for several times, followed by being dried at room temperature (20° C).The fibers are then calcinated at 700° C. in Ar flow for 2 h to form free-standing CNT hollow fiber membranes.

SEM images indicate that the obtained mutiwalled CNT hollow fiber membranes have no cracks, and possess an outer diameter of 800 μm and an inner diameter of 600 μm.

Example 6

Surface modification of CNTs: About 10 g pristine mutiwalled CNTs with 40~60 nm in outer diameters are added into a mixture of concentrated sulfuric acid and nitric acid (3:1, v/v). The mixture is then heated at 60° C. for 3 h. Subsequently, CNTs are recovered by filtration after diluting the concentrated acid solution, followed by being washed with water until pH of the filtrate is nearly neutral. At last, the recovered CNTs are dried at 60° C. for 12 h.

Wet-spinning process: Typically, 5.0 g surface-functionalized CNTs and 2.5 g PVB are dispersed and dissolved, respectively, in 50 g N-methyl pyrrolidone to form homogeneous spinning solution. The spinning solution as shell liquid and water as core liquid are squeezed at flow rates of 4 mL/h and 4 mL/h, respectively, into water through a spinneret to form CNT/PVB hollow fibers.

Calcination: The obtained CNT/PVB hollow fibers are dredged up from the water after being washed for several times, followed by being dried at room temperature (20° C). The fibers are then calcinated at 600° C. in Ar flow for 2 h to form free-standing CNT hollow fiber membranes.

SEM images indicate that the obtained mutiwalled CNT hollow fiber membranes have no cracks, and possess an outer diameter of 550 μm and an inner diameter of 380 μm. Closer examination reveals a random pore structure, characterized by an interwoven network of CNTs (FIG. 4).

We claim:

1. A method for the high-throughput preparation of carbon nanotube hollow fiber membranes comprises:
    (1) surface modification of pristine CNTs: carbon nanotubes (CNTs) are added into a mixture of concentrated sulfuric acid and nitric acid with a volumetric ratio of sulfuric acid to nitric acid of ≤5:1, which is heated at 40~80° C. for 0.5~6 hours; CNTs are then recovered by filtration;
    (2) wet-spinning process: the surface-functionalized CNTs and polyvinyl butyral (PVB) are dispersed and dissolved, respectively, in an organic solvents at a mass ratio of 1:0.2~1:4~8 to produce a homogeneous spinning solution; the spinning solution and water as shell liquid and core liquid, respectively, are squeezed at a flow rate ratio of 0.5~5:1 into water through a spinneret to form CNT/PVB hollow fibers;
    (3) calcination: the obtained fibers are dredged up from the water and dried after being washed for several times, followed by being calcinated at 600~1000° C. for 1~4 hours in absence of oxygen to form free-standing CNT hollow fiber membranes;
    wherein the spinning solution involved in Step (2) contains polymeric additives, and the mass ratio of the polymeric additives to CNTs is ≤0.2.

2. According to claim 1, the polymeric additives are polyacrylonitrile or poly (vinylidene fluoride) or sulfonated polyphenyleneoxide, or a mixture of several kinds of them.

3. According to claim 2, the organic solvents involved in Step (2) are N,N-dimethyl formamide or N,N-dimethyl acetamide or N-methyl pyrrolidone, or a mixture of several kinds of them.

4. According to claim 2, the CNTs involved in Step (1) are single-walled CNTs or double-walled CNTs or multiwalled CNTs, or a mixture of several kinds of them.

5. According to claim 1, the organic solvents involved in Step (2) are N,N-dimethyl formamide or N,N-dimethyl acetamide or N-methyl pyrrolidone, or a mixture of several kinds of them.

6. According to claim 5, the CNTs involved in Step (1) are single-walled CNTs or double-walled CNTs or multiwalled CNTs, or a mixture of several kinds of them.

7. According to claim 1, the CNTs involved in Step (1) are single-walled CNTs or double-walled CNTs or multiwalled CNTs, or a mixture of several kinds of them.

* * * * *

UNITED STATES PATENT AND TRADEMARK OFFICE
CERTIFICATE OF CORRECTION

PATENT NO. : 10,179,314 B2
APPLICATION NO. : 15/120637
DATED : January 15, 2019
INVENTOR(S) : Quan et al.

Page 1 of 1

It is certified that error appears in the above-identified patent and that said Letters Patent is hereby corrected as shown below:

On the Title Page

(73) Assignee should read: Dalian University of Technology, Liaoning (CN)

Signed and Sealed this
Fourth Day of February, 2020

Andrei Iancu
*Director of the United States Patent and Trademark Office*